(12) United States Patent
Giles et al.

(10) Patent No.: US 9,002,602 B2
(45) Date of Patent: Apr. 7, 2015

(54) METHOD OF DETERMINING A CURRENT OPERATING RANGE OF A TRANSFER CASE

(71) Applicant: GM Global Technology Operations LLC, Detroit, MI (US)

(72) Inventors: Peter John Giles, Ypsilanti, MI (US); Michael A. Turley, Dexter, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 13/919,048

(22) Filed: Jun. 17, 2013

(65) Prior Publication Data

US 2014/0372002 A1    Dec. 18, 2014

(51) Int. Cl.
*G06F 7/00* (2006.01)
*F16H 61/02* (2006.01)

(52) U.S. Cl.
CPC .................................. *F16H 61/0213* (2013.01)

(58) Field of Classification Search
CPC ...... B60K 23/08; B60K 17/344; B60K 17/16; B60K 17/3467
See application file for complete search history.

(56) References Cited

U.S. PATENT DOCUMENTS

| | | | | |
|---|---|---|---|---|
| 2004/0220009 | A1* | 11/2004 | Yu et al. | 475/198 |
| 2010/0107811 | A1* | 5/2010 | McCloy | 74/665 F |
| 2013/0337951 | A1* | 12/2013 | Hasewend et al. | 474/86 |

\* cited by examiner

*Primary Examiner* — David D Le
(74) *Attorney, Agent, or Firm* — Quinn Law Group, PLLC

(57) ABSTRACT

A method of determining a current operating range of a transfer case includes continuously calculating current Combined Drive Ratio (CDR), and categorizing the current CDR into one of a pre-determined number of expected CDRs. Counters are used to track when the current CDR is identified as an expected CDR. The different counters are then analyzed using simple mathematical operations to identify which gear ratio the transfer case is currently operating in.

20 Claims, 4 Drawing Sheets

| 42 | 44 | 46 | 48 | 50 | 52 | 54 |
|---|---|---|---|---|---|---|
| 1st | 4.079 | 1.000 | 1.000 | 4.079 | 2.620 | 10.687 |
| 2nd | 2.289 | 1.000 | 1.000 | 2.289 | 2.620 | 5.997 |
| 3rd | 1.472 | 1.000 | 1.000 | 1.472 | 2.620 | 3.857 |
| 4th | 1.000 | 1.000 | 1.000 | 1.000 | 2.620 | 2.620 |
| 5th | 0.809 | 1.000 | 1.000 | 0.809 | 2.620 | 2.120 |
| Rev | 3.795 | 1.000 | 1.000 | 3.795 | 2.620 | 9.943 |

FIG. 2

| 60 | 58 | 62 |
|---|---|---|
| 5th/High | 0.809 | 0.032 |
| 4th/High | 1.000 | 0.040 |
| 3rd/High | 1.472 | 0.059 |
| 5th/Low | 2.120 | 0.085 |
| 2nd/High | 2.289 | 0.092 |
| 4th/Low | 2.620 | 0.105 |
| Rev/High | 3.795 | 0.152 |
| 3rd/Low | 3.857 | 0.154 |
| 1st/High | 4.079 | 0.163 |
| 2nd/Low | 5.997 | 0.240 |
| Rev/Low | 9.943 | 0.398 |
| 1st/Low | 10.687 | 0.427 |

FIG. 3

| 66 | 64 | 68 | 70 |
|---|---|---|---|
| 5th/High | 0.809 | 0.777<br>0.841 | VH |
| 4th/High | 1.000 | 0.960<br>1.040 | VH |
| 3rd/High | 1.472 | 1.413<br>1.531 | VH |
| 5th/Low | 2.120 | 2.035<br>2.204 | UVL |
| 2nd/High | 2.289 | 2.197<br>2.381 | UVH |
| 4th/Low | 2.620 | 2.515<br>2.725 | VL |
| 3rd/Low | 3.857 | 3.702<br>4.011 | UVL |
| 1st/High | 4.079 | 3.916<br>4.242 | UVH |
| 2nd/Low | 5.997 | 5.757<br>6.237 | VL |
| 1st/Low | 10.687 | 10.260<br>11.114 | VL |

FIG. 4

METHOD OF DETERMINING A CURRENT OPERATING RANGE OF A TRANSFER CASE

TECHNICAL FIELD

The invention generally relates to a method of determining the current operating range, e.g., either a high range or a low range, of a transfer case of a vehicle.

BACKGROUND

A transfer case for a vehicle typically operates in two different gear ratios, often referred to as a high range and a low range. The vehicle controller must identify the current operating gear ratio, i.e., the current operating range, in order to provide the correct engine and transmission controls management, and to meet onboard diagnostic requirements. The vehicle controller must quickly and accurately identify the current operating range of the transfer case in order to prevent damage to other components of the vehicle. For example, when the vehicle controller identifies that the transfer case is operating in the low gear ratio range, the vehicle controller may, for example, limit the vehicle speed to protect a planetary gearset of the transfer case, limit engine torque to protect drive shafts and axles, provide the appropriate engine pedal progression map for vehicle performance, provide the correct transmission output shaft speed calculation to provide proper transmission shift schedules, and allow for the proper operation of the onboard diagnostic monitors.

Typically, multiple algorithms and multiple calibrations for the same algorithm are required to verify the transfer case ratio. This is due to differences in vehicle configuration such as the transmission type; whether an automatic or a manual transmission is used; such as the number of transmission gears and their gear ratios; and the location and the number of speed sensors. Some vehicles have only an engine speed sensor or a transmission input shaft speed sensor. The most advantageous sensor for verifying the transfer case ratio is the transmission output shaft speed sensor, along with the transfer case output shaft speed sensor. Most vehicles with automatic transmissions are now equipped with the transmission output shaft speed sensor but this sensor may be removed on some applications to package the transfer case in the driveline.

Most algorithms that are required to use an engine speed sensor or the transmission input shaft speed sensor to verify the transfer case ratio will compare a calculated transfer case ratio to the theoretical transfer case ratio. This is accomplished by inferring the value of the transmission output shaft speed and then dividing by the transfer case output shaft speed. The transmission output shaft speed is inferred by multiplying the engine speed or transmission input shaft speed by the theoretical ratio of the transmission current commanded gear. When the transmission input shaft speed is noisy or erratic or when the clutches in the transmission are slipping in a particular gear, the inferred value of the transmission output shaft speed is usually incorrect. This often results in a false verification of the transfer case ratio.

Inferring the transmission output shaft speed requires the transmission to remain in the same gear long enough to verify the transfer case ratio. Requiring the transmission remain in a particular gear for a minimum time improves the robustness of the transfer case ratio verification. However, typically the driver will quickly traverses through the lower transmission gear ratios, particularly on manual transmissions, which prolongs the verification of the transfer case ratio. An additional problem occurs when an automatic transmission has an overrunning clutch in a particular gear. If the overrunning clutch is present, the vehicle must remain in a power-on (engine driving the transmission) condition in order for the transmission gear ratio to equal the theoretical transmission gear ratio. During a power-off (wheels driving the engine) condition, the transmission gear ratio is no longer equal to the theoretical gear ratio—due to the overrunning clutch—which causes the inferred transmission output shaft speed calculation to be incorrect.

Verifying the transfer case ratio appears to be a simple process. However, multiple algorithms and calibrations are required when confronted with multiple vehicle configurations, varying number and location of speed sensors, vehicle failures such as noisy speed signals, slipping clutches—on both manual and automatic transmissions—variation in vehicle driving patterns, difference in gear ratios etc. Even if the vehicle has a transmission output shaft speed, which eliminates the requirement of inferring the transmission output shaft speed, the vehicle should account for a failed sensor.

SUMMARY

A method for determining the operating range of a vehicle's transfer case is provided. The vehicle includes an engine, a transmission coupled to the engine and including a plurality of different transmission gear ratios, a transfer case coupled to the transmission and including at least two different gear ratios, and an axle coupled to the transfer case and including an axle gear ratio. The vehicle includes a control module that is configured for determining which gear ratio the transfer case is operating in. Accordingly, the control module determines the current operating range of the transfer case by continuously measuring the overall Combined Drive Ratio (CDR) which could include one or all of the following; the transmission gear ratio, the transfer case gear ratio, and the axle gear ratio. The method for determining the current operating range of a transfer case includes defining each of a pre-determined number of expected Combined Drive Ratios (CDR), and classifying each as either one of an expected Verified High CDR, an expected Un-verified High CDR, an expected Verified Low CDR, or an expected Un-verified Low CDR. The predetermined number of expected CDR's is defined by using each individual transmission gear ratio, each transfer case gear ratio and the axle ratio. The current CDR of the vehicle is continuously calculated. It is then determined if the calculated current CDR is identified as one of a pre-determined number of expected CDRs. The time the calculated current CDR has been identified as one of the pre-determined number of expected CDRs is measured. Each pre-determined expected CDR has a counter that is incremented, from a value of zero to a value of one, if the measured time the calculated current CDR has been identified as one of the pre-determined number of expected CDRs is greater than a minimum time period. The counter for the pre-determined expected CDR is further incremented, from a value of one to a value of two, if the measured time the calculated current CDR has been identified as one of the pre-determined number of expected CDRs is greater than a second time period, and it has been defined as an expected Verified CDR, as opposed to an Un-verified CDR. The counter for the pre-determined expected CDR is further incremented, from a value of one to a value of two, when it has been assessed as 'identified' for a second time. This occurs when the assigned timer for a 'Verified' expected CDR exceeded the first time threshold but then was reset before it had reached the second time threshold. This would occur when the actual current CDR changes due to the transmission gear ratio changing.

Each predetermined expected CDR that has been defined shall have an assigned counter and timer. The actual current CDR of the vehicle is continuously measured and calculated. The actual measured current CDR is then compared to each of the defined predetermined expected CDR's. The various counters for the CDRs are analyzed by performing simple mathematical functions to determine the current transfer case range. The values of the counters for each of the pre-determined number of expected CDRs defined as an expected Verified High CDR are summed, i.e., added together, to define a total counter sum for the expected Verified High CDRs. The values of the counters for each of the pre-determined number of expected CDRs defined as an expected Un-verified High CDR are summed, i.e., added together, to define a total counter sum for the expected Un-verified High CDRs. The values of the counters for each of the pre-determined number of expected CDRs defined as an expected Verified Low CDR are summed, i.e., added together, to define a total counter sum for the expected Verified Low CDRs. The values of the counters for each of the pre-determined number of expected CDRs defined as an expected Un-verified Low CDR are summed, i.e., added together, to define a total counter sum for the expected Un-verified Low CDRs. The total counter sum for the expected Verified High CDRs is multiplied by the total counter sum for the expected Un-verified High CDRs to define a total product for the high range CDRs. The total counter sum for the expected Verified Low CDRs is multiplied by the total counter sum for the expected Un-verified Low CDRs to define a total product for the low range CDRs. The transfer case is determined to be operating in a low range when the total counter sum for the expected Verified Low CDRs is equal to or greater than two (or some other calibration threshold), or when the total product for the low range CDRs is equal to or greater than one (or some other calibration threshold). The transfer case is determined to be operating in a high range when the total counter sum for the expected Verified High CDRs is equal to or greater than two (or some other calibration threshold), or when the total product for the high range CDRs is equal to or greater than one (or some other calibration threshold).

The methodology in this algorithm provides the ability to automatically use the transmission input shaft speed sensor if the transmission output shaft speed sensor fails. Additionally, if the transmission input shaft speed sensor were to fail, the algorithm provides the ability to use the engine speed sensor. All vehicles have an engine speed sensor and the engine speed sensor must be working correctly in order for the vehicle to operate. If the transfer case output shaft speed sensor no longer works, this algorithm provides the ability to automatically use the wheel speed sensors.

The present invention provides the ability to use one algorithm for every vehicle configuration. It provides the ability to accurately determine the transfer case ratio when the vehicle traverses quickly through multiple transmission gears since multiple ratios are used in multiple fashions. The algorithm is capable of automatic calibration by simply entering the multiple gear ratios—including reverse—of the transmission and the transfer case and the single axle ratio. The algorithm is able to verify the transfer case ratio by identifying multiple expected Combined Drive Ratios (CDRs) in a short duration or one CDR in an extended duration. The algorithm provides additional robustness by reducing the probability that a slipping clutch in a transmission or a noisy speed sensor will result in determining the incorrect transfer case range.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a table showing the expected Combined Drive Ratio's for a five speed transmission with a two speed transfer case.

FIG. 3 is a table showing a +/− tolerance for each of the expected CDRs.

FIG. 4 is a table showing a numerical range for each expected CDR.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Figure 1:
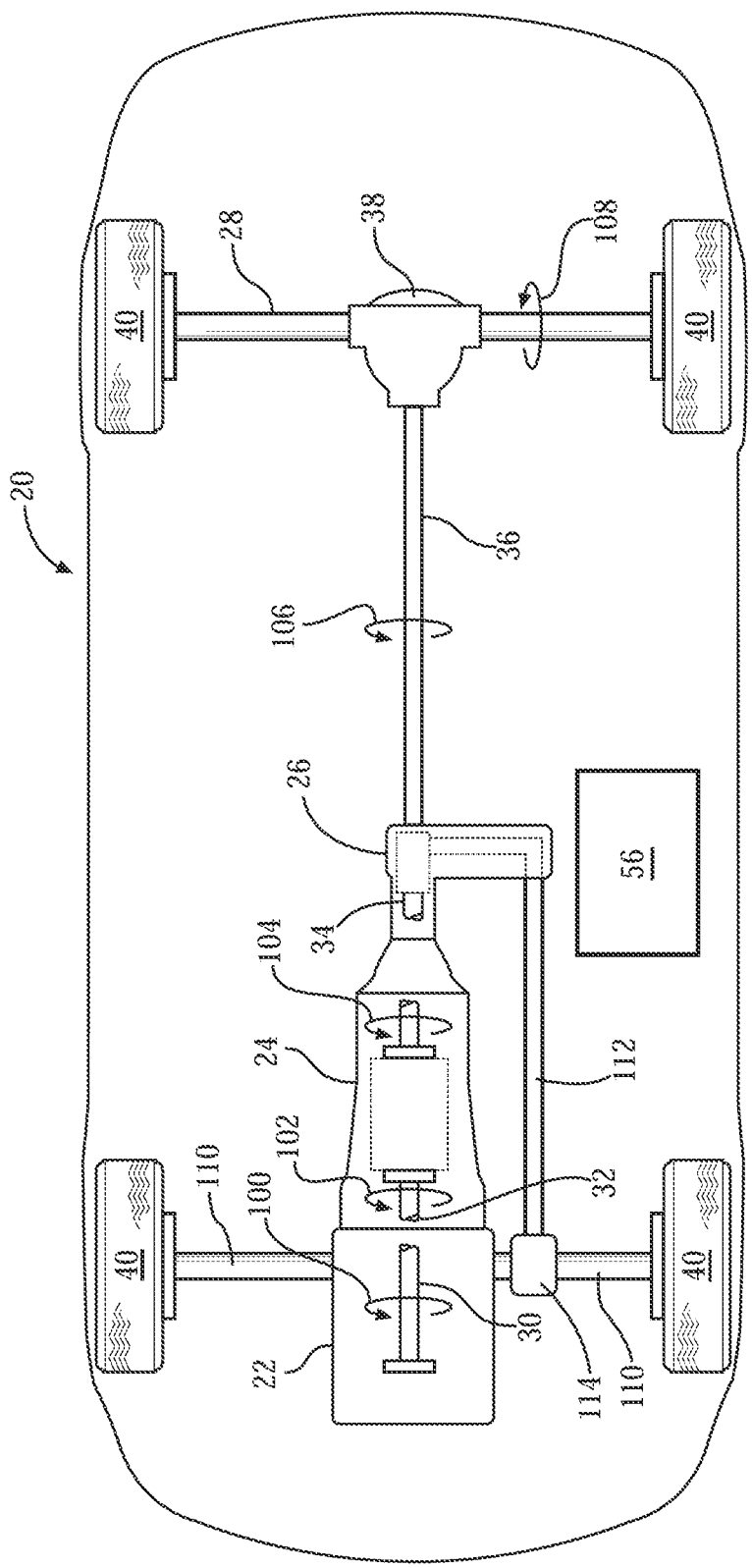
FIG. 1 is a schematic plan view of a vehicle.

Referring to the Figures, wherein like numerals indicate like parts throughout the several views, a vehicle is schematically shown at 20 in FIG. 1. Referring to FIG. 1, the vehicle 20 includes an engine 22, a transmission 24, a transfer case 26, a rear axle hereinafter referred to as the driven axle 28, and a front or secondary axle hereinafter referred to as the non-driven axle 110. The engine 22 may include any style, size and/or configuration of engine 22 suitable for a vehicle 20, including but not limited to a gasoline engine or a diesel engine. The engine 22 produces a drive torque, which is output through a crankshaft 30.

The transmission 24 is coupled to the engine 22, and includes a plurality of different gear ratios. For example, the transmission 24 may include four, five, six, eight, nine, ten, or more different gear ratios. A transmission input shaft 32 is coupled to the crankshaft 30, and receives the drive torque from the engine 22. A transmission output shaft 34 is coupled to the transmission input shaft 32 via a gear set (not shown), which defines the plurality of different gear ratios. The transmission output shaft 34 transfers the drive torque to the transfer case 26, which is coupled to the transmission 24.

The transfer case 26 includes at least two different gear ratios. Typically, the transfer case 26 includes two different gear ranges, commonly referred to as a high range and a low range. If the vehicle 20 is a four wheel drive, rear-drive vehicle 20, then the transfer case 26 includes two different gear ratios. The drive torque output from the transmission 24 is passed through one of the gear ratios of the transfer case 26. The transfer case 26 includes a first transfer case output shaft 36, which couples the transfer case 26 and the driven axle 28, and transmits the drive torque from the transfer case 26 to the driven axle 28. The driven axle 28 includes a differential 38 having a gear set (not shown) that defines an axle gear ratio, through which the drive torque is passed. The driven axle 28 transfers the drive torque to at least one drive wheel 40, which is attached to the drive axle 28, to drive the vehicle 20. The transfer case 26 includes a second transfer case output shaft 112, which couples the transfer case 26 and the non-driven axle 110, and transmits the drive torque from the transfer case 26 to the non-driven axle 110. The non-driven axle 110 includes a differential 114 having a gear set (not shown) that defines an axle gear ratio, through which the drive torque is passed. The non-driven axle 110 transfers the drive torque to at least one drive wheel 40, which is attached to the non-driven axle 110, to drive the vehicle 20.

The vehicle 20 further includes a control module 56. The control module 56 is configured for determining which gear ratio the transfer case 26 is currently operating in, e.g., the high range or the low range. The control module 56 may include a computer and/or processor, and include all software, hardware, memory, algorithms, connections, sensors, etc., necessary to manage and control the operation of the drivetrain components, and more specifically determine which gear ratio the transfer case 26 is operating in. As such, a method, described below, may be embodied as a program operable on the control module 56. It should be appreciated that the control module 56 may include any device capable of analyzing data from various sensors, comparing data, making the necessary decisions required to determine which gear ratio the transfer case 26 is operating in, and executing the required tasks necessary to perform the described method.

The control module 56 continuously calculates a current Combined Drive Ratio (CDR) of the vehicle 20. The current CDR is the combined drive ratio that the vehicle 20 is currently operating in. Calculating the current CDR includes dividing an input speed by an output speed. The input speed may include one of a rotational speed of the crankshaft 30, i.e., an engine crankshaft speed 100, a rotational speed of the transmission input shaft 32, i.e., a transmission input shaft speed 102, or a rotational speed of the transmission output shaft 34, i.e., a transmission output shaft speed 104. The output speed may include one of a rotational speed of the transfer case output shaft 36, i.e., a transfer case output shaft speed 106, or a rotational speed of the axle 28, i.e., an axle speed 108. The axle speed 108 may be defined to equal a single or combined rotational speed of a left and/or right drive wheel 40 of the driven axle 28. The control module 56 calibrates the input speed and/or the output speed based upon which of the available sources is utilized for the input. As such, the controller may change between available sources of the input speed and/or the output speed as necessary. Therefore, if the source of either the input speed or the output speed becomes faulty or unreliable, the control module 56 may shift to a different source for either the input speed or the output speed. The input speed and the output speed may be sensed in any suitable manner, such as through a dedicated rotational speed sensor.

The different gear ratios of the transmission 24, the transfer case 26, and the driven axle 28 combine to define a predetermined number of discrete expected Combined Drive Ratio's (CDR). Each possible combination of the various different gear ratios define one of the discrete expected CDRs. The discrete expected CDRs are determined by combining each individual transmission gear ratio, for each transfer case gear ratio, with the axle ratio. Accordingly, the pre-determined number of discrete expected CDRs is dependent upon the number of available gear ratios in the transmission 24, the number of gear ratios of the transfer case 26, and the gear ratio of the driven axle 28.

If the assigned input speed for measuring the actual or current CDR is the transmission output shaft speed, then the transmission gear ratios are not used for defining the predetermined discrete expected CDRs. However, the control module 56 may automatically assign the transmission input shaft speed as the input speed for measuring the CDR if, at any point in time, the transmission output shaft speed fails. Furthermore, if the transmission output shaft speed fails or the transmission input shaft speed fails, at any point in time, the engine speed may be assigned as the input speed for measuring the actual or current CDR.

The predetermined discrete expected CDRs are determined for each potential combination of assigned input speed and assigned output speed. For example, if the assigned input speed for calculating the current CDR is the engine crankshaft speed 100, then each transmission gear ratio is multiplied by the high range transfer case gear ratio for the high range expected CDRs. Similarly, each transmission gear ratio is multiplied by the low range transfer case gear ratio for the low range expected CDRs. If the assigned output shaft speed is the transfer case output shaft speed 106, then each of the individual expected CDRs must be further multiplied by the axle ratio of the driven axle 28.

The predetermined discrete expected CDR ratios are separated into two groups. The first set, titled the High Range Expected CDRs, is grouped based on the predetermined discrete expected CDRs that are calculated using the high range transfer case gear ratio. The second set, titled the Low Range Expected CDRs, shall be grouped based on the predetermined discrete expected CDRs calculated using the low range transfer case gear ratio. The first set, i.e., the High Range Expected CDRs, is then categorized as one of either a 'Verified' High Range Expected CDR or an 'Unverified' High Range Expected CDR. Similarly, the second set, i.e., the Low Range Expected CDRs, is categorized as one of either a 'Verified' Low Range Expected CDR or an 'Unverified'' Low Range Expected CDR. Each predetermined verified and unverified high range and low range discrete expected CDR has a theoretical calculated ratio. Each calculated ratio is assigned an upper limit and lower limit. The upper limits and the lower limits are based on a calibratable tolerance using a percent of each expected discrete CDR. If a two percent tolerance has been assigned, then the tolerance is determined by multiplying the theoretical expected CDR by (0.02). This calculated tolerance is added to the expected CDR for the upper limit and subtracted from the expected CDR for the lower limit. If the upper limit or the lower limit of an individual predetermined discrete expected CDR does not overlap any one of the other individual predetermined discrete expected CDRs, then that CDR is categorized as a 'Verified' Expected CDR. Otherwise, it is defined as an 'Unverified' Expected CDR. The number of predetermined discrete High Range and Low Range 'Verified' and 'Unverified' Expected CDRs shall vary based on the number of transmission gear ratios and their theoretical value.

Referring to FIG. 2, all of the possible expected CDRs are presented for an exemplary drivetrain. The exemplary drivetrain represented in FIG. 2 includes a transmission 24 having five forward gear ratios and one reverse gear ratio, a transfer case 26 having two different gear ratios, i.e., a high range and a low range, and a driven axle 28 having one gear ratio. Accordingly, for the exemplary drivetrain, there are twelve different expected CDRs possible. It should be appreciated that other drivetrains may define a greater number of expected CDRs or a smaller number of expected CDRs.

Within FIG. 2, the gear position of the transmission 24 is shown in column 42, and the respective gear ratio for each of the gear positions are shown in column 44. The high range gear ratio of the transfer case 26 is defined as 1.000, and is shown in column 46. The gear ratio of the axle 28 is defined as 1.000, and is shown in column 48.

The expected CDRs for the high range of the transfer case 26 are shown in column 50, and may be calculated by multiplying each specific transmission gear ratio by the high range transfer case 26 gear ratio, and then multiplying that product by the gear ratio of the axle 28. Accordingly, the expected CDR for the first transmission gear ratio, which is defined herein as being equal to 4.079, when operating in the high range of the transfer case 26, which is defined herein as being equal to 1.000, may be calculated by multiplying the first transmission gear ratio (4.079) by the high range gear ratio of the transfer case 26 (1.000), and then multiplying that product by the gear ratio of the axle 28 (1.000). As such, the expected CDR for the first transmission gear ratio when operating in the high range of the transfer case 26, is equal to (4.079)×(1.000)×(1.000)=4.079.

The low range gear ratio of the transfer case 26 is defined as 2.620, and is shown in column 52. The expected CDRs for the low range of the transfer case 26 are shown in column 54, and may be calculated by multiplying each specific transmission gear ratio by the low range transfer case 26 gear ratio, and then multiplying that product by the gear ratio of the axle 28. Accordingly, the expected CDR for the first transmission gear ratio, which is defined herein as being equal to 4.079, when operating in the low range of the transfer case 26, which is defined herein as being equal to 2.620, may be calculated by multiplying the first transmission gear ratio (4.079) by the low range gear ratio of the transfer case 26 (2.620), and then multiplying that product by the gear ratio of the axle 28 (1.000). As such, the expected CDR for the first transmission gear ratio when operating in the low range of the transfer case 26, is equal to (4.079)×(2.620)×(1.000)=10.687.

In order to account for losses in the drivetrain and/or manufacturing variances in the different components of the vehicle 20, the numeric range associated with each of the pre-determined number of expected CDRs is defined. Referring to FIG. 3, the expected CDRs of the exemplary drivetrain described above are shown in column 58, and are arranged vertically in ascending order. The combination of the gear position of the transmission 24, i.e., $1^{st}$, $2^{nd}$, $3^{rd}$, $4^{th}$, $5^{th}$ or Rev, and the gear ratio of the transfer case 26, i.e., high or low, associated with each respective expected CDR are shown to the left of the expected CDRs, in column 60. The numeric range for each of the expected CDRs may be defined and/or calculated by adding and subtracting a tolerance to each of the expected CDRs. The tolerance may be defined as a percentage of the expected CDR, and may vary between, for example, two percent and five percent. A tolerance of four percent for each of the expected CDRs is shown to the right of the expected CDRs, in column 62.

Referring to FIG. 4, the expected discrete CDRs of the exemplary drivetrain described above are shown in column 64, and are arranged vertically in ascending order. The combination of the gear position of the transmission 24, i.e., $1^{st}$, $2^{nd}$, $3^{rd}$, $4^{th}$, $5^{th}$, and the gear ratio of the transfer case 26, i.e., high or low, associated with each respective expected CDR are shown to the left of the expected CDRs, in column 66. The expected CDRs associated with the reverse gear ratio of the transmission 24 are not used in the method described below, and are therefore omitted from FIG. 4. Column 68 of FIG. 4 presents both the upper limit and the lower limit of each numeric range to the right of the expected CDRs shown in column 64. The lower limit for each numeric range is shown vertically above the respective upper limit of the numeric range. The lower limit of the numeric range for each respective expected CDR is calculated by subtracting the tolerance factor, shown in column 62 of FIG. 3, from the respective expected CDR. The upper limit of the numeric range for each respective expected CDR is calculated by adding the tolerance factor, shown in column 62 of FIG. 3, to the respective expected CDR.

As noted above, each of the pre-determined number of expected CDRs is defined as one of either an expected Verified High CDR, an expected Un-verified High CDR, an expected Verified Low CDR, or an expected Un-verified Low CDR. Each expected CDR is defined as verified when the numerical limits associated with that respective expected CDR do not overlap with the numerical limits of any other of the expected CDRs. Each expected CDR is defined as un-verified when the numerical limits associated with that respective expected CDR overlap with the numerical limits of any of the other expected CDRs. Column 70 of FIG. 4 indicates the category of each of the pre-determined number of expected CDRs. Within column 70 of FIG. 4, the symbol "VH" indicates that specific expected CDR is defined as an expected Verified High CDR, the symbol "UVH" indicates that specific expected CDR is defined as an expected Un-verified High CDR, the symbol "VL" indicates that specific expected CDR is defined as an expected Verified Low CDR, and the symbol "UVL" indicates that specific expected CDR is defined as an expected Un-verified Low CDR.

The calculated current CDR is then categorized into one of the pre-determined number of expected CDRs. The control module 56 identifies which numerical range the calculated current CDR is within, and categorizes the calculated current CDR as that expected CDR. Accordingly, the control module 56 categorizes the calculated current CDR into the one of the pre-determined number of expected CDRs associated with the numeric range in which the calculated current CDR is within.

The control module 56 includes a counter for each of the pre-determined number of expected CDRs. The control module 56 monitors the period of time that the calculated current CDR is categorized within a respective expected CDR. When the time period that the calculated current CDR is categorized within an expected CDR is greater than the minimum time period, the control module 56 increments the counter for that respective expected CDR, from a value of zero to a value of one. If that respective expected CDR in which the current CDR is categorized in is defined as either an expected Verified High CDR or an expected Verified Low CDR, and when the time period that the calculated current CDR is categorized in that respective expected CDR is greater than a second time period, then the control module 56 increments the counter for that respective expected CDR, from a value of one to a value of two.

The actual measured current CDR is compared to each of the pre-determined number of discrete expected CDRs. This comparison determines if the actual measured current CDR matches one or more of the predetermined number of discrete expected CDRs. An individual predetermined discrete expected CDR is assessed as 'identified' when the actual measured current CDR is between its respective upper limit and lower limit for a specified continuous (calibratable) time. When the predetermined discrete expected CDR has been assessed as 'identified, its assigned timer has exceeded the minimum time (calibratable) threshold, its assigned counter is incremented from a value of zero to a value of one. If the assigned timer of a 'Verified' Expected CDR exceeds a second time (calabratable) threshold, without resetting, than its assigned counter shall increment from a value of one to a value of two. The respective counter for all predetermined discrete expected CDRs categorized as a 'Verified' Expected CDR, as opposed to an 'Unverified' Expected CDR, may be further incremented from a value of one to a value of two. The assigned counter for an individual predetermined discrete expected CDR that has been categorized as an 'Unverified' Expected CDR, shall never be incremented to a value greater than one. The assigned counters for the predetermined discrete 'Verified' Expected CDRs may also be further incremented, from a value of one to a value of two, if they are assessed as 'identified' for a second time. This occurs when the assigned timer for a 'Verified' Expected CDR exceeded the minimum time threshold but then was reset before it reached the second time threshold due to the actual current CDR no longer being between its respective upper limit and lower limit. The same 'Verified' Expected CDR may again be assessed as 'identified' again, at some later point in time, which would result in its respective assigned counter incrementing from a value of one to a value of two.

The second time period is longer than the minimum time period. Preferably, the minimum time period is between the range of 200 and 250 milliseconds, and the second time period is between the range of 0.5 and 1.0 seconds. However, it should be appreciated that the minimum time period and the second time period may vary from the exemplary ranges provided herein.

The values of the counters associated with each of the expected Un-verified CDRs, i.e., the expected Un-verified High CDRs or the expected Un-verified Low CDRs, are limited to a maximum value of one. The values of the counters associated with each of the expected Verified CDRs, i.e., the expected Verified High CDRs or the expected Verified Low CDRs, are limited to a maximum value of two.

The assigned counters for the High Range Expected CDRs, i.e., the expected high CDRs, are evaluated separately from the assigned counters for the Low Range Expected CDRs, i.e., the expected low CDRs. The assigned counters for the High Range Expected CDRs shall be grouped together but further separated into 'Verified' and 'Unverified' High Range Expected CDRs. Furthermore, the assigned counters for the Low Range Expected CDRs shall be grouped together but further separated into 'Verified' and 'Unverified' Low Range Expected CDRs. A algorithm for evaluating the values of all the assigned counters shall be employed for determining the state of the transfer case ratio as being one of the High Range or the Low Range.

The algorithm continuously calculates the sum total of all the High Range 'Verified' Expected CDRs and the sum total of all the High Range 'Un-verified' Expected CDRs. Additionally, the algorithm calculates the sum total of all the Low Range 'Verified' Expected CDRs and the sum total of all the Low Range 'Unverified' expected CDRs. The methodology for determining the transfer case range as high range or low range evaluates the assigned counters for the Verified' Expected CDRs differently than the 'Unverified' Expected CDRs. This is achieved by weighting or biasing the 'Verified' Expected CDRs more than the 'Un-verified' Expected CDRs. If the sum total of all the assigned counters for the High Range 'Verified' Expected CDRs reaches a threshold (calibratable) level the transfer case is determined to be in the High Range. Furthermore, if the sum total of all the assigned counters for the Low Range 'Verified' Expected CDRs reaches a threshold (calibratable) level the transfer case is determined to be in the Low Range. The sum total of all the assigned counters for the High Range or Low Range 'Unverified' Expected CDRs shall never determine range of the transfer case. However, the sum total of all the assigned counters for the High Range 'Unverified' Expected CDRs, when multiplied to the sum total of all the assigned counters of the High Range 'Verified' Expected CDRs, equals or exceeds a threshold (calibratable) level, the transfer case is determined to be in the high range. Furthermore, the sum total of all the assigned counters for the Low Range 'Unverified' Expected CDRs, when multiplied to the sum total of all the assigned counters of the Low Range 'Verified' Expected CDRs, equals or exceeds a threshold (calibratable) level, the transfer case is determined to be in the low range.

As described above, the values of the counters for each of the pre-determined number of expected CDRs defined as an expected Verified High CDR are summed together to define a total counter sum for the expected Verified High CDRs. For example, referring to FIG. 5, the counters of the expected Verified High CDRs are shown in column 72. The various counters are identified by their respective combination of the gear position of the transmission 24, i.e., $1^{st}$, $2^{nd}$, $3^{rd}$, $4^{th}$, $5^{th}$, and the gear ratio of the transfer case 26, i.e., high or low. The values of the respective counters are shown to the right in column 74. The total counter sum for the expected Verified High CDRs is shown at the bottom of column 74, in row 76 of FIG. 5.

Figure 5:
FIG. 5 is a table showing values for counters associated with expected high range Verified CDRs

As shown in FIG. 5, the counter for the expected CDR associated with the $3^{rd}$ gear ratio of the transmission 24 and the high range of the transfer case 26 is defined as being equal to one. Neither of the counters for either of the expected CDR associated with the $4^{th}$ gear ratio of the transmission 24 and the high range of the transfer case 26, nor the $5^{th}$ gear ratio of the transmission 24 and the high range of the transfer case 26, have registered a value. Therefore, the total counter sum for the expected Verified High CDRs is defined as equal to a value of one (i.e., 1+0+0=1).

The values of the counters for each of the pre-determined number of expected CDRs defined as an expected Un-verified High CDR are summed together to define a total counter sum for the expected Un-verified High CDRs. For example, referring to FIG. 6, the counters of the expected Un-verified High CDRs are shown in column 78. The various counters are identified by their respective combination of the gear position of the transmission 24, i.e., $1^{st}$, $2^{nd}$, $3^{rd}$, $4^{th}$, $5^{th}$, and the gear ratio of the transfer case 26, i.e., high or low. The values of the respective counters are shown to the right in column 80. The total counter sum for the expected Un-verified High CDRs is shown at the bottom of column 80, in row 82 of FIG. 6.

Figure 6:
FIG. 6 is a table showing values for counters associated with expected high range Un-verified CDRs.

As shown in FIG. 6, the counter for the expected CDR associated with the $1^{st}$ gear ratio of the transmission 24 and the high range of the transfer case 26 is defined as being equal to one, and the counter for the expected CDR associated with the $2^{nd}$ gear ratio of the transmission 24 and the high range of the transfer case 26 is also defined as being equal to one. Therefore, the total counter sum for the expected Un-verified High CDRs is defined as equal to a value of two (i.e., 1+1=2).

The values of the counters for each of the pre-determined number of expected CDRs defined as an expected Verified Low CDR are summed together to define a total counter sum for the expected Verified Low CDRs. For example, referring to FIG. 7, the counters of the expected Verified Low CDRs are shown in column 84. The various counters are identified by their respective combination of the gear position of the transmission 24, i.e., $1^{st}$, 2, $3^{rd}$, $4^{th}$, $5^{th}$, and the gear ratio of the transfer case 26, i.e., high or low. The values of the respective counters are shown to the right in column 86. The total counter sum for the expected Verified Low CDRs is shown at the bottom of column 86, in row 88 of FIG. 7.

Figure 7:
FIG. 7 is a table showing values for counters associated with expected low range Verified CDRs

As shown in FIG. 7, the counter for the expected CDR associated with the $1^{st}$ gear ratio of the transmission 24 and the low range of the transfer case 26 is defined as being equal to one, and the counter for the expected CDR associated with the $2^{nd}$ gear ratio of the transmission 24 and the low range of the transfer case 26 is also defined as being equal to one. The counter for the expected CDR associated with the $4^{th}$ gear ratio of the transmission 24 and the low range of the transfer case 26 has not registered a value. Therefore, the total counter sum for the expected Verified Low CDRs is defined as equal to a value of two (i.e., 1+1+0=2).

The values of the counters for each of the pre-determined number of expected CDRs defined as an expected Un-verified Low CDR are summed together to define a total counter sum for the expected Un-verified Low CDRs. For example, referring to FIG. 8, the counters of the expected Un-verified Low CDRs are shown in column 90. The various counters are identified by their respective combination of the gear position of the transmission 24, i.e., $1^{st}$, $2^{nd}$, $3^{rd}$, $4^{th}$, $5^{th}$, and the gear ratio of the transfer case 26, i.e., high or low. The values of the respective counters are shown to the right in column 92. The total counter sum for the expected Un-verified Low CDRs is shown at the bottom of column 92, in row 94 of FIG. 8.

Figure 8:
FIG. 8 is a table showing values for counters associated with expected low range Un-verified CDRs.

As shown in FIG. 8, neither of the counters for either of the expected CDR associated with the $3^{rd}$ gear ratio of the transmission 24 and the low range of the transfer case 26, nor the $5^{th}$ gear ratio of the transmission 24 and the low range of the transfer case 26, have registered a value. Therefore, the total counter sum for the expected Un-verified Low CDRs is defined as equal to a value of zero (i.e., 0+0=0).

The total counter sum for the expected Verified High CDRs is multiplied by the total counter sum for the expected Un-verified High CDRs to define a total product for the high range CDRs. Referring to FIG. 5, the total counter sum for the expected Verified High CDRs is shown being equal to a value of 1, and referring to FIG. 6, the total counter sum for the expected Un-verified High CDRs is shown being equal to a value of 2. Accordingly, the total product for the high range CDRs for the example shown in FIGS. 5 and 6 is equal to a value of two (i.e., 1×2=2).

The control module 56 may determine that the transfer case 26 is operating in the low range when the total counter sum for the expected Verified Low CDRs is equal to or greater than two, or when the total product for the low range CDRs is equal to or greater than one. The control module 56 may determine that the transfer case 26 is operating in the high range when the total counter sum for the expected Verified High CDRs is equal to or greater than two, or when the total product for the high range CDRs is equal to or greater than one. Accordingly, for the example provided in FIGS. 5 and 6, although the total counter sum of the expected Verified High CDRs is only equal to one, the control module 56 may still determine that the transfer case 26 is operating in the high range because the total product for the high range CDRs is equal to two.

The total counter sum for the expected Verified Low CDRs is multiplied by the total counter sum for the expected Un-verified Low CDRs to define a total product for the low range CDRs. Referring to FIG. 7, the total counter sum for the expected Verified Low CDRs is shown being equal to a value of 2, and referring to FIG. 8, the total counter sum for the expected Un-verified Low CDRs is shown being equal to a value of 0. Accordingly, the total product for the low range CDRs for the example shown in FIGS. 7 and 8 is equal to a value of zero (i.e., 2×0=0).

As noted above, the control module 56 may determine that the transfer case 26 is operating in the low range when the total counter sum for the expected Verified Low CDRs is equal to or greater than two, or when the total product for the low range CDRs is equal to or greater than one. The control module 56 may determine that the transfer case 26 is operating in the high range when the total counter sum for the expected Verified High CDRs is equal to or greater than two, or when the total product for the high range CDRs is equal to or greater than one. Accordingly, for the example provided in FIGS. 7 and 8, although the total product for the low range CDRs is equal to zero, the control module 56 may still determine that the transfer case 26 is operating in the high range because the total counter sum of the expected Verified Low CDRs is equal to two.

If the control module 56 is unable to make a determination on whether the transfer case 26 is operating in either the high range or the low range, and the calculated current CDR changes so that the current CDR is no longer within the numeric range of the one of the expected CDRs, then the control module 56 re-categorizes the calculated current CDR into another of the pre-determined number of expected CDRs as described above, and continues the process. The control module 56 continuously increments the counters for each of the expected CDRs as the current CDR is categorized in each respective expected CDR. Once the control module 56 is able to make a determination that the transfer case 26 is operating in either the high range or the low range, then the control module 56 may reset all of the counters associated with each of the expected CDRs to a value of zero and begin the process again.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a vehicle, the method comprising:
    defining each of a pre-determined number of expected Combined Drive Ratios (CDR) as one of either an expected Verified High CDR, an expected Un-verified High CDR, an expected Verified Low CDR, or an expected Un-verified Low CDR;
    repeatedly calculating a current CDR of the vehicle by sensing an input speed with a first rotational speed sensor, sensing an output speed with a second rotational speed sensor, and dividing the sensed input speed by the sensed output speed with a processor of a vehicle controller;
    categorizing the calculated current CDR into one of the pre-determined number of expected CDRs with the vehicle controller;
    monitoring a period of time the calculated current CDR is categorized in the one of the pre-determined number of expected CDRs with the vehicle controller;
    incrementing a counter stored in a memory of the vehicle controller for the one of the pre-determined number of expected CDRs, from a value of zero to a value of one, if the monitored time the calculated current CDR is categorized in the one of the pre-determined number of expected CDRs is greater than a minimum time period;
    further incrementing the counter for the one of the pre-determined number of expected CDRs, from a value of one to a value of two, if the monitored time the calculated current CDR is categorized in the one of the pre-determined number of expected CDRs is greater than a second time period and the one of the pre-determined number of expected CDRs is defined as either an expected Verified High CDR or an expected Verified Low CDR;

determining that a transfer case is operating in a low range, with the vehicle controller, when a total counter sum for the expected Verified Low CDRs is equal to or greater than two, or when a total product for the low range CDRs is equal to or greater than one;

determining that the transfer case is operating in a high range, with the vehicle controller, when a total counter sum for the expected Verified High CDRs is equal to or greater than two, or when a total product for the high range CDRs is equal to or greater than one; and controlling the operation of the vehicle based on which of the low range or the high range the vehicle controller determines that the vehicle is currently operating in.

2. A method as set forth in claim 1 wherein repeatedly calculating the current CDR of the vehicle includes:

summing the values of the counters for each of the pre-determined number of expected CDRs defined as an expected Verified High CDR to define a total counter sum for the expected Verified High CDRs;

summing the values of the counters for each of the pre-determined number of expected CDRs defined as an expected Un-verified High CDR to define a total counter sum for the expected Un-verified High CDRs;

summing the values of the counters for each of the pre-determined number of expected CDRs defined as an expected Verified Low CDR to define a total counter sum for the expected Verified Low CDRs;

summing the values of the counters for each of the pre-determined number of expected CDRs defined as an expected Un-verified Low CDR to define a total counter sum for the expected Un-verified Low CDRs;

multiplying the total counter sum for the expected Verified High CDRs by the total counter sum for the expected Un-verified High CDRs to define a total product for the high range CDRs; and multiplying the total counter sum for the expected Verified Low CDRs by the total counter sum for the expected Un-verified Low CDRs to define a total product for the low range CDRs.

3. A method as set forth in claim 2 further comprising defining a numeric range associated with each of the pre-determined number of expected CDRs.

4. A method as set forth in claim 3 wherein categorizing the calculated current CDR into one of the pre-determined number of expected CDRs includes identifying which numerical range the calculated current CDR is within.

5. A method as set forth in claim 4 wherein categorizing the calculated current CDR includes categorizing the calculated current CDR into the one of the pre-determined number of expected CDRs associated with the numeric range in which the calculated current CDR is within.

6. A method as set forth in claim 3 wherein defining each of a pre-determined number of expected Combined Drive Ratios (CDR) as one of either an expected Verified High CDR, an expected Un-verified High CDR, an expected Verified Low CDR, or an expected Un-verified Low CDR includes defining each expected CDR as verified when the numerical limits associated with the respective expected CDR do not overlap with the numerical limits of any other of the expected CDRs, and defining each expected CDR as un-verified when the numerical limits associated with the respective expected CDR overlap with the numerical limits of any of the other expected CDRs.

7. A method as set forth in claim 3 wherein an upper limit of the numeric range for each respective expected CDR is calculated by adding a tolerance factor to the respective expected CDR, and wherein a lower limit of the numeric range for each respective expected CDR is calculated by subtracting the tolerance factor from the respective expected CDR.

8. A method as set forth in claim 7 wherein the tolerance factor is between the range of two percent and five percent of the respective expected CDRs.

9. A method as set forth in claim 3 further comprising re-categorizing the calculated current CDR into another of the pre-determined number of expected CDRs when the value of the calculated current CDR is no longer within the numeric range of the one of the pre-determined number of expected CDRs.

10. A method as set forth in claim 1 further comprising calculating the expected CDRs by multiplying each available transmission gear ratio of the vehicle, each available transfer case gear ratio of the vehicle, and an axle gear ratio of the vehicle together.

11. A method as set forth in claim 1 wherein the second time period is longer than the minimum time period.

12. A method as set forth in claim 11 wherein the minimum time period is between the range of 200 and 250 milliseconds, and wherein the second time period is between the range of 0.5 and 1.0 seconds.

13. A method as set forth in claim 2 wherein sensing the input speed includes sensing one of an engine crankshaft speed, a transmission input shaft speed, or a transmission output shaft speed, and wherein sensing the output speed includes sensing one of a transfer case output shaft speed or a wheel axle shaft speed.

14. A method as set forth in claim 1 further comprising limiting the values of the counters associated with each of the expected un-verified CDRs to a maximum value of one, and limiting the values of the counters associated with each of the expected verified CDRs to a maximum value of two.

15. A method as set forth in claim 1 further comprising providing a control module including all sensors, processors, electronic connections, and memory having computer-executable instructions saved thereon necessary to:

define each of the pre-determined number of expected Combined Drive Ratios (CDR) as one of either an expected Verified High CDR, an expected Un-verified High CDR, an expected Verified Low CDR, or an expected Un-verified Low CDR;

continuously calculate the current CDR of the vehicle;

categorize the calculated current CDR into one of the pre-determined number of expected CDRs;

monitor the time the calculated current CDR is categorized in the one of the pre-determined number of expected CDRs;

increment the counter associated with the one of the pre-determined number of expected CDRs, from a value of zero to a value of one, when the monitored time the calculated current CDR is categorized in the one of the pre-determined number of expected CDRs is greater than the minimum time period;

further increment the counter for the one of the pre-determined number of expected CDRs, from a value of one to a value of two, when the monitored time the calculated current CDR is categorized in the one of the pre-determined number of expected CDRs is greater than the second time period and the one of the pre-determined number of expected CDRs is defined as either an expected Verified High CDR or an expected Verified Low CDR;

sum the values of the counters associated with each of the pre-determined number of expected CDRs defined as an expected Verified High CDR, to define a total counter sum for the expected Verified High CDRs;

sum the values of the counters for each of the pre-determined number of expected CDRs defined as an expected Un-verified High CDR, to define a total counter sum for the expected Un-verified High CDRs;

sum the values of the counters for each of the pre-determined number of expected CDRs defined as an expected Verified Low CDR, to define a total counter sum for the expected Verified Low CDRs;

sum the values of the counters for each of the pre-determined number of expected CDRs defined as an expected Un-verified Low CDR, to define a total counter sum for the expected Un-verified Low CDRs;

multiply the total counter sum for the expected Verified High CDRs by the total counter sum for the expected Un-verified High CDRs, to define a total product for the high range CDRs;

multiply the total counter sum for the expected Verified Low CDRs by the total counter sum for the expected Un-verified Low CDRs, to define a total product for the low range CDRs;

determine that the transfer case is operating in the low range when the total counter sum for the expected Verified Low CDRs is equal to or greater than two, or when the total product for the low range CDRs is equal to or greater than one; and determine that the transfer case is operating in the high range when the total counter sum for the expected Verified High CDRs is equal to or greater than two, or when the total product for the high range CDRs is equal to or greater than one.

16. A vehicle comprising:

an engine;

a transmission coupled to the engine and including a plurality of different gear ratios;

a transfer case coupled to the transmission and including at least two different gear ratios;

an axle coupled to the transfer case and including an axle gear ratio; and a control module including all sensors, processors, electronic connections, and memory having computer-executable instructions saved thereon operable to determine which range the transfer case is operating in, wherein the control module is operable to:

define each of a pre-determined number of expected Combined Drive Ratios (CDR) as one of either an expected Verified High CDR, an expected Un-verified High CDR, an expected Verified Low CDR, or an expected Un-verified Low CDR;

continuously calculate a current CDR of the vehicle;

categorize the calculated current CDR into one of the pre-determined number of expected CDRs;

monitor a time period the calculated current CDR is categorized in the one of the pre-determined number of expected CDRs;

increment a counter associated with the one of the pre-determined number of expected CDRs, from a value of zero to a value of one, when the monitored time the calculated current CDR is categorized in the one of the pre-determined number of expected CDRs is greater than a minimum time period;

further increment the counter for the one of the pre-determined number of expected CDRs, from a value of one to a value of two, when the monitored time the calculated current CDR is categorized in the one of the pre-determined number of expected CDRs is greater than a second time period and the one of the pre-determined number of expected CDRs is defined as either an expected Verified High CDR or an expected Verified Low CDR;

sum the values of the counters associated with each of the pre-determined number of expected CDRs defined as an expected Verified High CDR, to define a total counter sum for the expected Verified High CDRs;

sum the values of the counters for each of the pre-determined number of expected CDRs defined as an expected Un-verified High CDR, to define a total counter sum for the expected Un-verified High CDRs;

sum the values of the counters for each of the pre-determined number of expected CDRs defined as an expected Verified Low CDR, to define a total counter sum for the expected Verified Low CDRs;

sum the values of the counters for each of the pre-determined number of expected CDRs defined as an expected Un-verified Low CDR, to define a total counter sum for the expected Un-verified Low CDRs;

multiply the total counter sum for the expected Verified High CDRs by the total counter sum for the expected Un-verified High CDRs, to define a total product for the high range CDRs;

multiply the total counter sum for the expected Verified Low CDRs by the total counter sum for the expected Un-verified Low CDRs, to define a total product for the low range CDRs;

determine that the transfer case is operating in the low range when the total counter sum for the expected Verified Low CDRs is equal to or greater than two, or when the total product for the low range CDRs is equal to or greater than one; and determine that the transfer case is operating in the high range when the total counter sum for the expected Verified High CDRs is equal to or greater than two, or when the total product for the high range CDRs is equal to or greater than one.

17. A vehicle as set forth in claim 16 wherein the control module is operable to define a numeric range associated with each of the pre-determined number of expected CDRs.

18. A vehicle as set forth in claim 17 wherein the control module is operable to re-categorizing the calculated current CDR into another of the pre-determined number of expected CDRs when the value of the calculated current CDR is no longer within the numeric range of the one of the pre-determined number of expected CDRs.

19. A vehicle as set forth in claim 17 wherein the control module is operable to receive an input speed from one of the engine and the transmission, and receive an output speed from one of the transfer case and the axle, wherein the input speed includes one of an engine crankshaft speed, a transmission input shaft speed, or a transmission output shaft speed, and wherein the output speed includes one of a transfer case output shaft speed or a wheel axle shaft speed.

20. A vehicle as set forth in claim 19 wherein the control module is operable to calculate the current CDR by dividing the input speed by the output speed.

* * * * *